Jan. 6, 1925.                                            1,522,191
O. JUNGGREN
ELASTIC FLUID TURBINE
Filed Dec. 8, 1923

Inventor:
Oscar Junggren,
by *His Attorney.*

Patented Jan. 6, 1925.

1,522,191

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

ELASTIC-FLUID TURBINE.

Application filed December 8, 1923. Serial No. 679,482.

*To all whom it may concern:*

Be it known that I, OSCAR JUNGGREN, a citizen of the United States, residing at Schenectady, in the county of Schenectady, State of New York, have invented certain new and useful Improvements in Elastic-Fluid Turbines, of which the following is a specification.

The present invention relates to elastic fluid turbines and especially to such turbines when designed to operate at very high fluid pressures as 1000 pounds for example. It is evident that the casings for such turbines must be exceedingly strong to withstand the high fluid pressure and that the interior parts of the turbine such as the nozzles, diaphragms, packings, etc. must be so constructed and arranged as to be free to expand and contract radially with temperature changes without imposing additional stresses due to such action on the casing.

My present invention has for its object the provision of a turbine which is capable of operating at very high pressures and temperatures. For a consideration of what I believe to be novel and my invention, attention is directed to the accompanying description and claims appended thereto.

Figure 1:
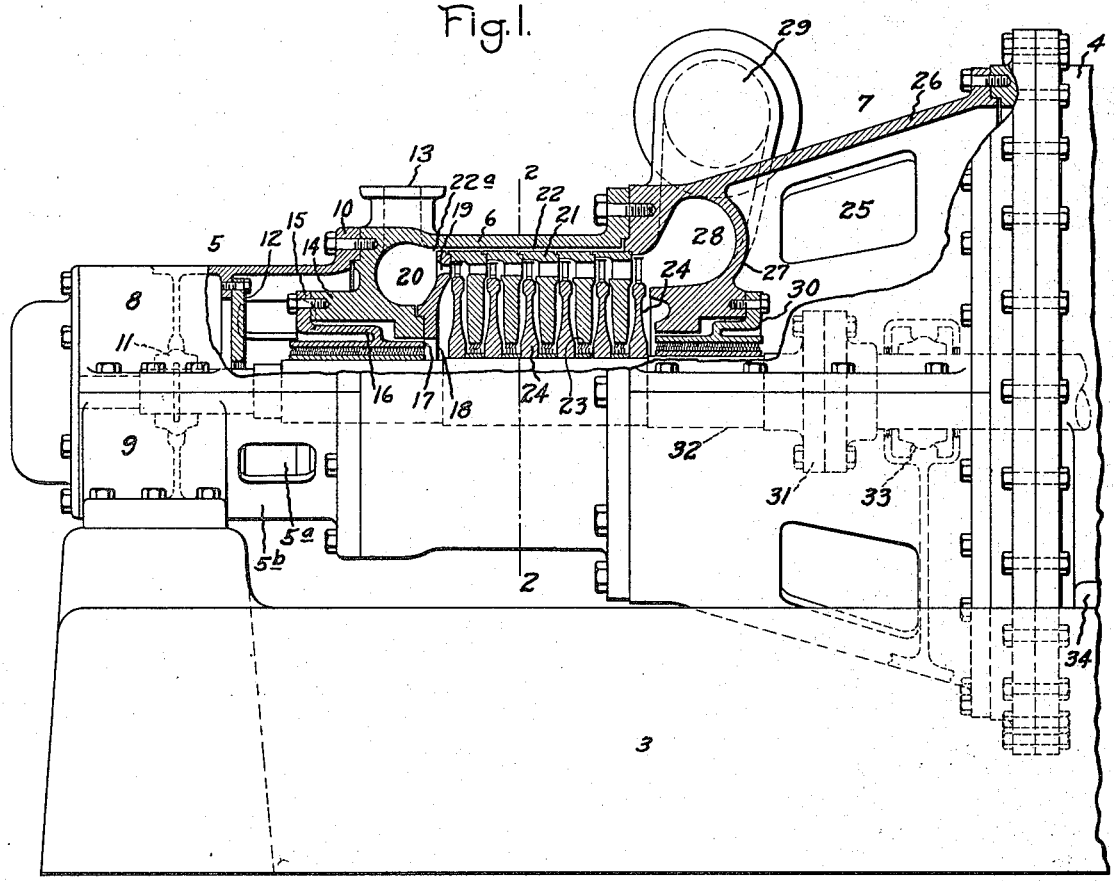
Figure 2:
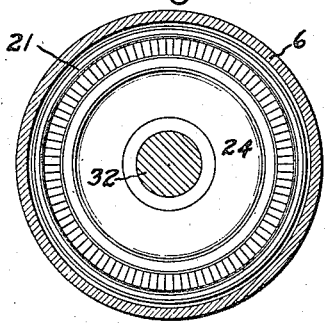
Figure 3:

In the accompanying drawing, which is illustrative of my invention, Fig. 1 is a side view of a high pressure multi-stage impulse turbine, with certain of the parts shown in section; Fig. 2 is a cross section, taken on line 2—2 of Fig. 1, and Fig. 3 is a detail view on an enlarged scale showing how the diaphragms are seated on one another.

The structure illustrated forms the high pressure element of a multi-stage turbo-generator unit, the exhaust from which is delivered to one or more other elements operating at lower pressures and which drive or may drive electric generators.

3 indicates the bed plate or foundation which supports the turbine and the generator 4, one end of which latter only is illustrated. The turbine casing considered as an entirety is divided into three principal elements 5, 6 and 7. The element 5 is divided as usual in the horizontal plane of the shaft into two parts an upper part 8 and a lower part 9 said parts being flanged at their meeting edges and united by numerous bolts. The elements are provided with an annular flange 10 which is rabbeted or shouldered to the central element 6. Inside of the element 5 is located the shaft bearing 11, shown in dotted lines, and usually a thrust bearing at the outer end. Said element also forms the pillow block for the shaft bearing and has feet which are bolted to the foundation. 12 indicates a partition having a shaft opening and is designed to prevent the heat of the high pressure packing from directly affecting the bearing and the lubricating oil therein.

As the casing elements 5 and 6 are subjected to greatly different temperatures, it is evident that they will expand and contract radially by different amounts. To permit of this difference in expansion the element 5 instead of being a complete unbroken annulus is cut away as at 5ª to form bars 5ᵇ which although of relatively massive construction in order to support the weight and resist strains are capable of and do yield sufficiently to permit differences in radial expansion without injury. The cut-away portions also permit of a circulation of air which assists in preventing the transfer of heat directly from the hot element 6 to the cooler element 5.

The intermediate element 6 instead of being divided in two parts, an upper and a lower, in accordance with common practice in turbines of ordinary construction, is made of a single piece steel casting or forging and is rabbeted and bolted at its ends to the element 5 and to the exhaust element 7. It is also provided with a steam inlet conduit 13 cast integral therewith. Inside of the element and formed integral therewith is a head 14 having an annular and axially extending member 15 to which the stationary member of the high pressure packing is bolted. This member is provided with an annular part 16 to which is secured the carrier 17 for the stationary teeth or elements of a labyrinth packing, the co-operating member being carried by the shaft. It will be observed that the point of attachment of the part 16 to the member is relatively thin and that the part is separated from the wall of the annulus 15 by space. This arrangement permits the parts to expand and contract both radially and axially without interference from the main casing element. Inside of the casing element and on the head 14 is a shoulder, and supported thereon is a ring 18 having nozzles 19 near its periphery. This ring unlike prior constructions does not engage the inner surface of the casing element and being supported wholly at the center by the shoulder is free to expand and contract without affecting the casing. The ring co-operates with the casing head to form a steam chest 20 which communicates with the inlet 13.

The diaphragms 21 of which any number may be provided are of similar construction the only difference being that the nozzle areas increase from the high pressure to the low pressure end and some changes in dimensions are made to compensate for the change in the nozzles. The low pressure diaphragm is seated on a shoulder formed on the third or exhaust element 7. The inlet side of each diaphragm is provided with a shoulder 21$^a$, Fig. 3, on which is seated the next diaphragm of higher pressure. These shoulders on the parts are so arranged that the diaphragms are centered one on the other except the first and last and these are supported and centered by the head of the machine and the exhaust element respectively.

Between the periphery of each diaphragm and the inner wall of the surrounding casing is an annular clearance 22 which is in open communication with the steam chest through clearance 22$^a$ around the high pressure nozzle ring 19. As a result of this a belt of high pressure steam will surround the diaphragm and serve to reduce condensation in the several stages.

Each diaphragm is also provided with a stage packing member 23 which co-operates with a packing member on the shaft. Between the diaphragms and also on the exhaust side of the low pressure one, are bucket wheels 24 of any suitable construction, each having a peripheral row of buckets through which the steam flows axially.

The exhaust or low pressure element 7 is divided in the horizontal plane of the shaft into two parts, an upper and a lower which are bolted together at their meeting flanges. One end of the element is rabbeted to the middle element 6 and the other end to the casing of the generator or other power-absorbing apparatus. That portion of the element which forms a connecting and supporting means is provided with openings 25 which divide the structure into relatively massive bars 26 which are capable of yielding sufficiently to permit of radial expansion of the element 6 without causing undue strains and stresses in the generator casing. In this respect the construction is similar to that of right hand part of element 5 and for the same reason.

At the left hand end of the element and cast integral with the parts thereof is a head 27 which is hollowed out to form an annular exhaust chamber 28. Formed integral with the upper part and communicating with the chamber is a flanged outlet conduit 29 through which steam is conveyed to the unit of lower pressure. The head also supports the outer member of the low pressure shaft packing, the construction of which is the same as that of the high pressure packing, differing only in size. The specific construction of the co-operating parts of the packing has not been illustrated because the invention is not limited in this particular. Inside of the element 7 is a rigid coupling 31 for uniting the parts of the shaft 32 of the turbine and generator. A bearing 33 for the generator end is also mounted in the element. The generator casing is also supported by the foundation, a portion of one of the supporting feet being shown at 34.

Owing to the arrangement of the parts it will be seen that in assembling and disassembling the casing element and rotor parts must be separated by relative axial movements. Generally this will be done by first removing the element 5 and then the element 6, first taking out the holding bolts. To assemble the rotor the low pressure wheel will usually first be mounted on the shaft, then a diaphragm, then a wheel and so on.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:—

1. In an elastic fluid turbine, the combination of a rotor, a casing comprising an annular one piece element which encloses the rotor and is adapted to be mounted in place by relative axial movements of said parts, other elements located at the ends of the rotor enclosing element for supporting it, there being provision in each of the last named elements permitting independent radial expansion and contraction of the rotor enclosing element, and a bed plate on which the said end elements are mounted.

2. In an elastic fluid turbine, the combination of a rotor, a casing comprising an annular one piece element which encloses the rotor and is adapted to be mounted in place by relative axial movements of said parts, annular two piece elements which are bolted to the ends of the enclosing element for supporting it, each of said elements including yielding members which permit independent radial expansion and contraction of the enclosing element, and a bed plate upon which the end elements are mounted.

3. In an elastic fluid turbine, the combination of a rotor comprising a plurality of bucket wheels and a shaft, a single piece casing element for the rotor having a shouldered high pressure head, a detachable element for closing the low pressure end of the casing which is also shouldered, nozzle diaphragms which are spaced from the casing wall are located between the wheels and have interlocking means whereby they are supported one on the other, the diaphragms at opposite ends of the casing being supported by said shoulders, means for discharging fluid to the first wheel, and an exhaust conduit.

4. In an elastic fluid turbine, the combination of a rotor comprising a plurality of bucket wheels and a shaft, a single piece casing element for the rotor having a head which forms a part of the fluid-admitting chest and is provided with a shoulder, an annular nozzle-carrying member which cooperates with the head to form said chest, and is seated on the shoulder, an element for closing the low pressure end of the casing which is provided with a shoulder, nozzle-carrying diaphragms between the wheels which are supported one on the other, the high pressure diaphragm being supported by the shoulder on the annular member and the low pressure diaphragm on the shoulder of the exhaust end closing element, and an exhaust conduit.

5. In an elastic fluid turbine, the combination of a rotor comprising a plurality of bucket wheels and a shaft, a single piece casing element for the rotor having a head which forms a part of the fluid admitting chest and is provided with a shoulder, an annular nozzle-carrying member which cooperates with the head to form said chest is seated on the shoulder and is separated from the inner wall of the casing by a clearance through which fluid is permitted to flow from the chest, an element for closing the low pressure end of the casing which is provided with a shoulder, nozzle-carrying diaphragms between the wheels which are supported one on the other with the end diaphragms supported by the member and shoulder, respectively, there being a space between the inner wall of the casing and the peripheries of the diaphragms which is in open communication with said clearance, and an exhaust conduit.

6. In an elastic fluid turbine, the combination of a rotor comprising bucket wheels and a shaft, a single piece annular casing element therefor, means for closing the high pressure end of the casing, an element for closing the low pressure end of the casing which also forms a support therefor, said element being provided with two concentric shoulders, the outer of which forms a seat for the annular casing, a nozzle-carrying member carried by said means which is provided with a shoulder near its periphery, nozzle-carrying diaphragms which are supported at the high pressure end by the shoulder on the nozzle-carrying member and at the low pressure end by the inner shoulder on said element, and inlet and exhaust conduits.

7. In an elastic fluid turbine, the combination of a rotor, a casing therefor, a portion of its head end defining a part of a fluid chest, a nozzle member mounted inside of the casing which defines the other part of the fluid chest, there being a radial clearance between the periphery of the member and the casing, nozzle diaphragms which are mounted within the casing, enclose the wheels and are separated from the casing by a space to which high pressure fluid from the chest is admitted for the purpose of reducing condensation of the fluid as it flows through the rotor, an inlet, and an exhaust outlet.

In witness whereof, I have hereunto set my hand this 7th day of December, 1923.

OSCAR JUNGGREN.